┌─────────────────────────────────────────────────────────────────┐
United States Patent Office                     3,557,063
                                           Patented Jan. 19, 1971
└─────────────────────────────────────────────────────────────────┘

3,557,063
CROSSLINKABLE POLYMERS
Gaetano F. D'Alelio, 2011 E. Cedar St.,
South Bend, Ind. 46617
No Drawing. Filed Nov. 25, 1968, Ser. No. 778,848
Int. Cl. C08f 27/12, 37/04; C08g 30/12
U.S. Cl. 260—78.4                                18 Claims

ABSTRACT OF THE DISCLOSURE

This invention deals with a new one-step process of preparing crosslinkable polymers having a plurality of repeating units of the formula $$-CH_2-C(R)-$$
$$\phantom{-CH_2-}COOCH_2$$

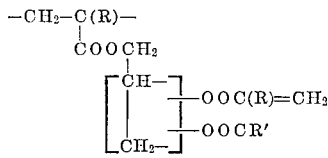

by reacting anhydrides of the formula $$CH_2=C(R)COOOCR'$$

with polymers containing the repeating unit

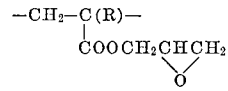

wherein R represents H and CH$_3$, the number of such repeating units is at least 2, and R' represents H, a hydrocarbon group containing one to twelve carbon atoms and halogenated derivatives thereof.

The process allows the facile and economical synthesis of a large number of crosslinkable polymers.

---

PRIOR ART

My copending application Ser. No. 581,687, filed Sept. 26, 1966 discloses a number of identical and related crosslinkable polymers prepared by a two-stage process.

THE DISCLOSURE OF THE INVENTION

This invention relates to crosslinkable polymers and to a new process of preparing them. More specifically it relates to crosslinkable polymers having activated vinyl or vinylidene pendant groups. The polymers of this invention are readily crosslinked by radical, anionic and cationic initiation and also by ultraviolet light and ionizing radiation. The polymers of this invention are related structurally to the polymers in my copending application Ser. No. 581,687 filed Sept. 26, 1966. This invention deals with a new one-step process of preparing polymers having a plurality of repeating units of the formula $$-CH_2-C(R)-$$
$$\phantom{-CH_2-}COOCH_2$$

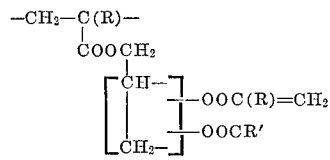

by the reaction of a polymer having a plurality of repeating units of the formula

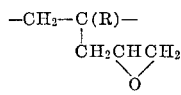

with a mixed anhydride, $CH_2=C(R)COOOCR'$, wherein R is hydrogen or methyl, R' is a hydrocarbon group containing one to twelve carbon atoms, and the number of such repeating units is at least 2, preferably at least 5.

In the above formulas the terminal portions are not indicated but these can be represented by K attached to the free terminal valencies, as shown in some formulas hereinafter. At least one of these K's is a fragment of a radial generating catalyst with which the starting polymer was initiated. The other K can represent another such fragment when polymer termination is caused by coupling of two polymer chains. Otherwise, when disproportionation occurs in the termination the other K is an olefinic unit from the starting monomer.

The glycidly polymers used in the above reaction can be prepared by the vinyl polymerization of the glycidyl acrylate type monomer, by means of radical initiators such as the peroxy and azo catalysts. Of the azo-type catalysts, asobisisobutyronitrile is especially preferred. If peroxide catalysts are used in such polymerizations, they are advantageously of the aliphatic types such as stearyl or lauroyl peroxide, etc. However, benzoyl peroxide, tertiary butyl peroxide and other well-known peroxy catalysts such as tertiary butyl peracetate can also be used.

Where a glycidyl acrylate homopolymer is desired, this can be obtained readily by polymerization in a suitable organic solvent such as ethyl acetate. Preferred, however, are the ketones such as methyl ethyl ketone, methyl isobutyl ketone, acetone, etc., as solvents. In such cases, a solution of 25–60% of the monomer in the ketone is used.

For copolymerizations in which there is a major part of a comonomer, other solvents such as toluene, benzene, tetrahydrofuran, etc., can be used as the medium for the polymerization. With azo-type catalysts, the polymerization temperature is advantageously about 75–80° C., the molecular weight depending on the amount of catalyst used. For lower molecular weight polymers, 3% of an azo catalyst such as azobisisobutyronitrile, etc., is used, and for higher molecular weight polymers or copolymers, 1% or 0.1% of the azo catalyst can be used.

In the reaction wherein the anhydride, $$CH_2=C(R)COOOCR'$$

is condensed with the oxirane ring of the polyglycidyl acrylate, it is desirable sometimes to use an inert gas atmosphere such as nitrogen or helium. While the reactivity of the above anhydride is generally sufficient to catalyze the opening of the oxirane ring this reaction proceeds slowly and it is generally desirable to catalyze this with a tertiary amine such as triethylamide, tributylamide, pyridine, 1,3,5-tris(dimethylaminomethyl)-phenol, triphenyl phosphine, etc. At least 0.01 percent, preferably at least 0.1 percent of such catalyst based on total weight of reagents is desirable.

While premature polymerization may not be sufficient in some cases to require an inhibitor, it is generally desirable that an inhibitor is present during the reaction with the anhydride in order to prevent premature polymerization of the derived polymer containing pendant acrylic or methacrylic ester groups, as for example, a small amount of an inhibitor, such as tertiary-butyl catechol, ditertiary butyl paracresol, hydroquinone, resorcinol or other di- or polyhydroxyphenols; phenolic resins, aromatic amines such as p,p'-phenylenediamine, 1,5-diaminonaphthalene, etc., pyrogallol, tannic acid, ascorbic acid, benzaldehyde, alpha-naphthol, sulfur compounds, etc., or other well known inhibitors for this purpose. Such catalysts or inhibitors are generally used in an amount of at least 0.1 percent preferably at least 0.5 percent by weight.

Generally about the equivalent amount or slight excess of that amount of the mixed anhydride acid should be used to be reacted with the oxirane rings, in any case at least one molar percent per molecule.

When the polymers of this invention are to be used as cross-linking modifiers for compositions eventually to be treated with ionizing radiation, it is desirable that the polymers of this invention, as well as the polymers to which they are added as modifiers, contain no aromatic nuclei or only limited amounts thereof. Larger proportions of such nuclei can be tolerated but as the proportions of aromatic nuclei in the respective polymers are increased, the radiation dosages required to effect crosslinking increases accordingly apparently due to the fact that aromatic ring compounds are energy sinks for irradiation.

As the starting polymer, glycidyl acrylate can be copolymerized with other vinyl monomers such as the acrylic and methacrylic esters such as the methyl, ethyl, propyl, butyl, hexyl, cyclohexyl, dodecyl, etc. esters. In addition to, or in lieu of these acrylic type esters used in copolymerization with the glycidyl acrylate to prepare the starting polymer, any other copolymerizable monovinyl or monovinylidene comonomer or mixtures thereof can be used, for example, the vinyl esters, that is vinylacetate, the monovinyl esters of saturated and unsaturated, aliphatic, monobasic and polybasic acids, and more specifically the vinyl esters of the following acids: propionic, isobutyric, valeric, caprylic, caproic, oleic, stearic, acrylic, methacrylic, crotonic, oxalic, malonic, succinic, glutaric, adipic, suberic, azelaic, maleic, fumaric, itaconic, mesaconic, hexahydrobenzoic, citric, trimesic, etc., as well as the corresponding allyl, methallyl, etc. esters of the aforementioned acids, acrylonitrile, methacrylonitrile, methacrylic acid, hydroxy propyl methacrylate, etc.; itaconic acid monoesters and diesters, such as the methyl, ethyl, butyl esters, the maleic and fumaric acid monoesters, diesters and their amide and nitrile compounds, such as diethyl maleate, maleyl diamide, fumaryl dinitrile, dimethyl fumarate, etc.; ethers, such as methallyl ethyl ether, vinyl ethyl ether, vinyl butyl ether, allyl propyl ether; cyanuric acid derivatives having one copolymerizable unsaturated group attached directly or indirectly to the triazine ring, such as allyl diethyl cyanurate, vinyl diethyl cyanurate, as well as the partial, soluble or fusible polymerizable polymers of the hereinabove listed monomers, etc.

The above aliphatic comonomers are preferred where the products are to be radiated. However, limited amounts, usually less than the molar equivalent of one or more of the above dialiphatic monomers, can be used without too large an increase in the required radiation dosage with the following aromatic comonomers. When used alone, larger radiation dosages are required. Where no radiation is to be used these aromatic monomers can be used by themselves or in combination with the aliphatic type. Typical suitable aromatic comonomers include vinyl aryl compounds such as styrene, vinyl naphthalene, vinyl toluene, vinyl xylene, vinyl phenol, vinyl ethyl benzene, vinyl dimethyl naphthalene, vinyl diphenyl, etc., vinyl phenyl ether, vinyl benzoate, vinyl naphthoate, vinyl methyl phthalate, allyl ethyl phthalate, allyl propyl phthalate, etc.

A few illustrative examples of suitable polymers which can be modified by or mixed with the crosslinkable polymers of this invention for subsequent radiation treatment are the non-aromatic type polymers such as polyvinylacetamide, polyacrylamide, polymethylacrylamide, polyhexamethylene adipamide, polyethylene adipamide, polyethylene azelamide, polyethylenediacrylamide, polyvinyl acetate, polyethyl acrylate, polymethyl methacrylate, cellulose acetate, cellulose butyrate, ethyl cellulose, polyethylene adipate, polyethylene azeleate, polydecamethylene succinate, polydecamethylene sebacate, the polyurethanes, natural and synthetic diene rubbers, etc. The polymers of this invention are also compatible with polyvinyl chloride, particularly upon the application of moderate heat.

Aromatic polymers that can be used particularly where the mixture is to be crosslinked by radical generating catalysts, include but are not limited to ethylene glycol-maleate-phthalate, ethyle glycol-phthalate, diallylphthalate, divinyl, phthalate, polyvinyl aryls, such as polystyrene, polyvinylnaphthalene, polyvinyl toluene, polyvinylbenzoate, polyvinylphenyl ether, polyvinylphenol, etc.

The polymeric compositions of this invention are particularly useful as coating compositions on all types of substrates, including cellulose in its various forms, such as paper, wood, paper board, wood board, wood pulp, regenerated cellulose in film or fiber form, laminates of various types including those prepared from fibrous fillers bonded with urea, melamine, epoxy and polyester resins, plaster board, concrete in its various forms such as slabs, blocks and the like. They may also be used as impregnants for porous bodies such as the compositions hereinabove named, as well as for synthetic and natural sponges, etc. Particularly do they find use as bonding agents and adhesives for solid, porous and foamed bodies. They can be used alone or admixed with each other or with other copolymerizable monomers, unsaturated or saturated polymers, in the absence or presence of dyes, pigments, plasticizers. For coating, impregnating or adhesive compositions where the presence of small amounts of solvent in the cured composition is not objectionable they can be mixed with volatile or non-volatile solvents best suited to the particular application.

The polymers of this invention are also useful in the preparation of copolymers with unsaturated alkyd resins. In carrying this portion of the invention into effect, an esterification product of a polyhydric alcohol and an alpha,alpha-unsaturated polycarboxylic acid is first prepared in accordance with techniques now well-known to those skilled in the alkyd resin art.

Any aliphatic polyhydric alcohol containing at least two esterifiable aliphatic hydroxy groups, or mixtures of such alcohols, can be used in preparing the unsaturated alkyd resins. Examples of such polyhydric alcohols are ethylene glycol, di-, tri- and tetraethyleneglycols, thiodiglycol, glycerine, pentaerythritol, 1,4-dihydroxy-butene-2, dimethylol cyclohexane, dihydrocyclohexane, etc. For compositions to be eventually radiated, any non-aromatic alpha,beta-polycarboxylic acid, or mixtures of such acids, can be reacted with the polyhydric alcohol or alcohols to form the unsaturated alkyd resin. Examples of such polycarboxylic acids are maleic, fumaric, citraconic, mesaconic, acetylene dicarboxylic, aconitic, cyclohexene dicarboxylic, etc., itaconic and its homologues, as, for instance, alpha-methyl itaconic acid, alpha-alpha-dimethyl itaconic acid, etc. Anhydrides of these polycarboxylic acids can also be employed.

In some cases, instead of using an unmodified, unsaturated alkyd resin, an unsaturated alkyd resin can be used which has been internally modified by replacing a part, say up to about 75 mole percent, of the unsaturated polycarboxylic acid with saturated aliphatic polycarboxylic acids, such as succinic, adipic, glutaric, pimelic, sebacic, azelaic, suberic, tricarballylic, etc.

The esterification products of polyhydric alcohols with ethylenic polycarboxylic acids, or with aliphatic polycarboxylicacids, can be further modified by introducing as a reactant in the preparation of the alkyd resin, a monoesterifiable compound or compounds, more particularly a saturated or unsaturated normal or isomeric monohydric alcohol, or mixture thereof, a saturated or unsaturated monocarboxylic acid, or mixture thereof, or both such esterifiable monohydroxy organic compounds as well as by the use of hydroxyacids.

Examples of monohydric alcohols which can be used as modifiers of the alkyd resin are propyl, isopropyl, butyl, isobutyl, amyl, isoamyl, hexyl, octyl, decyl, dodecyl, tetradecyl, cetyl, octadecyl, cyclohexyl, cyclopentyl, etc. The use of methyl and ethyl alcohol is not precluded, but in general these alcohols are less satisfactory because of their lower boiling points. As monobasic acids there can be used, for example, the unsubstituted saturated and unsaturated, normal or isomeric monocarboxylic acids containing only one esterifiable group, such as acetic, propionic, butyric to stearic, inclusive, hexahydrotoluic, acrylic, methacrylic, furoic acids, etc.

The monoesterifiable compounds can be introduced into the esterification before, during, or after the esterification of the polyhydric alcohol with the polycarboxylic acid under conditions that promote interesterification of the monoesterifiable compound with the incompletely esterified polyhydric alcohol-polycarboxylic acid product. That is, the monoesterifiable compound is introduced into the reaction mass before all of the acid groups of the polyhydric acid, or all of the alcohol groups of the polyhydric alcohol have been esterified.

The term "unsaturated non-aromatic alkyd resins," as used generally herein is intended to include within its meaning both unmodified esterification products of a non-aromatic polyhydric alcohol with a non-aromatic alpha-unsaturated, alpha,beta-polycarboxylic acid and esterification products of these components which have been modified, for example, as briefly described hereinabove. An alternate term is "unsaturated aliphatic alkyd resins" (including cycloaliphatic types).

To achieve copolymerization of the unsaturated alkyd resin with the crosslinkable polymers of this invention, a solution or mixture of the unsaturated alkyd resin in the crosslinkable polymer is first effected. Copolymerization of the components of the mixture is achieved readily by the addition of radical generating catalysts, and rapidly and advantageously by ionizing radiation, such as by atomic radiation from a reactor, or from cobalt 60, or by means of high energy electrons generated by an electron linear accelerator.

Typical examples of unsaturated alkyd resins are:

Alkyd Resin A—Ethylene glycol itaconate

| | Parts by wt. |
|---|---|
| Ethylene glycol | 23 |
| Itaconic acid | 52 |

The components are mixed and slowly heated in the course of one hour from room temperature to 190° C., in an inert nitrogen atmosphere, and held at this temperature for three to five hours.

Alkyd Resin B—Ethylene glycol maleate

| | Parts by wt. |
|---|---|
| Ethylene glycol | 31 |
| Maleic anhydride | 32 |

The compounds are mixed and heated as in the preparation of Alkyd Resin A to 190° C., and held at that temperature for four to six hours.

Alkyd Resin C—Acetic acid-modified diethylene glycol maleate

| | Parts by wt. |
|---|---|
| Diethylene glycol | 108 |
| Maleic anhydride | 88 |
| Acetic anhydride | 10 |

The ingredients are mixed together and refluxed for one hour in an inert atmosphere of nitrogen after which the reaction mixture is brought to 190° C., which temperature is maintained for four to six hours.

It will be understood, of course, that this invention is not limited to the use of the specific unsaturated alkyd resins mentioned above and that a broad modification of the nature of the copolymer is possible by using other unsaturated aliphatic alkyd resins or mixture of such resins. As illustrative examples of other unsaturated alkyd resins, the following esterification products can be used, as illustrated in Alkyd Resins D to I. Aromatic Alkyd Resin J is included for comparison.

| Alkyd Resin: | Components (parts) |
|---|---|
| D | Diethylene glycol (160) |
|   | Maleic anhydride (147) |
| E | Diethylene glycol (106) |
|   | Itaconic acid (130) |
| F | Glycerine (18.4) |
|   | Itaconic acid (39.0) |
| G | Ethylene glycol (610) |
|   | Maleic anhydride (19.6) |
|   | Hydroxypropyl acrylate (26.0) |
| H | Ethylene glycol (20) |
|   | Maleic anhydride (29.4) |
|   | Succinic acid (3.3) |
| I | Diethylene glycol (30.6) |
|   | Maleic anhydride (17.6) |
|   | Itaconic acid (15.6) |
| J | Diethylene glycol (30.3) |
|   | Maleic anhydride (13.2) |
|   | Phthalic anhydride (21.7) |

In many cases, instead of copolymerizing a single polymer of this invention with a single alkyd resin, mixture can be used of two or more of such polymers with a single alkyd resin, or a single such polymer with two or more alkyd resins, or a mixture of two or more such polymers with two or more resins.

The modified resins of this invention can be used alone or with fillers, dyes, pigments, opacifiers, lubricants, plasticizers, natural and synthetic resins or other modifying bodies in, for example, casting, molding, laminating, coating applications, and as adhesives, impregnants, and protective coatings.

In coating, impregnating and similar applications, the mixed monomeric or partially copolymerized materials, without added solvent, can be applied to the object to be treated and polymerized, with or without the application of heat and pressure, to form the final insoluble polymeric composition in situ. These new synthetic materials can be used as impregnants for many porous bodies, such as cork, pottery, felts, or fabricated bodies with interstices, such as the windings of electrical coils, netted fibers, interwoven cotton or glass materials, etc. They can also be used for the production of wire coatings and winding tapes, and for protectively coating impervious articles such as paper, wood cloth, glass fibers in felted, woven or other form, concrete, linoleum, synthetic boards, etc. These new synthetic materials can also be employed in making laminated fibrous sheet materials wherein superimposed layers of cloth, paper, glass fabrics or mats, etc., are firmly bonded together with these new compositions. Also, these new mixtures comprising at least one polymer of this invention and at least one other aliphatic resin, with or without modifying agents, can be cast under pressure while being irradiated.

In preparing the interpolymerization products of the crosslinkable polymer of this invention and the modifying polymer, the crosslinkable polymer of this invention can constitute as much as 98 to 99 percent by weight of the whole. In other cases the modifying polymer, alone or admixed with comonomers or modifiers, can constitute as much as 98 to 99 percent by weight of the whole.

In general, the proportions of the components used in a particular formulation will depend upon the particular properties desired in the interpolymer. For most applications, it is preferred to use 20 to 80 percent of the crosslinkable polymer of this invention and from 80 to 20 percent of the modifying polymer or monomer, since within these ranges interpolymers best adapted for most commercial applications can be produced.

Within these ranges the new interpolymers have a wide range of properties. For example, depending upon the particular crosslinking polymer and any modifying polymer or monomer, the particular proportions thereof, the conditions of polymerization, such as the temperature, pressure, presence or absence of additives, etc., the irradiation dose, and the extent of polymerization, they can vary from soft flexible bodies to hard rigid masses of varying resistance to solvents.

For coating or impregnating applications where the presence of a small amount of solvent in the cured composition is not objectionable, the mixed starting component can be diluted with volatile or nonvolatile solvents or diluents best suited for the particular service application, and then can be polymerized after the application of the solution to the particular article to be coated or impregnated, or impregnated and coated. By suitable selection of the starting material and the conditions of the interpolymerization, interpolymers can be obtained in an insoluble, infusible state practically resistant to the destructive effect of other chemical bodies, such as acid, bases, salts, solvents, swelling agents, and the like.

When it is desired to modify the properties of the crosslinkable polymers of this invention, this can be accomplished by copolymerizing a mixture comprising at least one such polymer with at least one copolymerizable monomer containing at least one unsaturated ethylenic, or acetylenic hydrocarbon radical, more particularly, a $CH_2=C<$ radical, such as vinyl, allyl, methallyl, vinylidene, etc., or with a copolymerizabe compound containing a $—CH=CH—$, or a $—CH=C<$, or a $>CH=CH<$ grouping, for example as in vinylidene fluoride, vinylidene cyanide, vinyl propionate, maleic anhydride, or its esters and amides, methyl maleic anhydride, tetrafluoroethylene, etc.

Additional examples of copolymerizable comonomers are monomeric or partially polymerized vinyl esters, such as the acetate, propionate, etc., vinyl ketones, methyl vinyl ketones, olefinic nitriles, such as acrylonitrile, methacrylonitrile, fumaryl nitrile, beta-cyanoethylacrylate, acrylic and methacrylic esters, for example, methyl acrylate, ethyl acrylate, propyl acrylate, butyl acrylate, ethyl methacrylate, propyl methacrylate, butyl methacrylate, octyl methacrylate, glycol dimethacrylate, allyl methacrylate, etc.; itaconic esters, for example, dimethyl itaconate, diethyl itaconate, diallyl itaconate; olefinic amides, for example, acrylamide, itaconamide, the maleic mono- and diamides, and the corresponding imides, etc., the vinyl ethers, for example, vinyl butyl ether, vinyl isobutyl ether, vinyl cyclohexyl ether, the dienes, etc., for example, butadiene, isoprene, dimethyl butadiene, etc., styrene, the o-, m- and p-styrenes, etc.

In preparing copolymers of the crosslinkable polymers with polymerizable comonomers such as methyl methacrylate, styrene, acrylonitrile, and the like, the crosslinkable polymer can constitute as little as 0.1 percent by weight of the whole, whereas in other cases the crosslinkable polymers can constitute as much as 98 to 99 percent of the whole. The proportion of the components in a particular formulation will depend upon the particular comonomers used and the particular properties desired in the copolymer. The polymers and copolymers can be prepared most readily by ionizing radiation.

In the following examples, the radiation doses are reported in megarads, which represent 1,000,000 rads. A "rad" is defined as the unit of absorbed dose and is equal to 100 ergs per gram.

In the anhydride formula $CH_2=C(R)COOOCR'$, R' represents hydrogen or a hydrocarbon group having one to 12 carbon atoms and halogen derivatives of such hydrocarbon groups. The hydrocarbon groups can be aliphatic, cycloaliphatic and aromatic. Typical hydrocarbon groups represented by R' include methyl, ethyl, propyl, butyl, hexyl, octyl, nonyl, decyl, dodecyl, cyclohexyl, cycloheptyl, methylcyclohexyl, ethylcycloheptyl, cyclohexylethyl, cycloheptylpropyl, phenyl, tolyl, xylyl, naphthyl, diphenyl, methylnaphthyl, ethyldiphenyl, butylnaphthl, diethylphenyl, benzyl, phenethyl, naphthylethyl, butenyl, allyl, phenylallyl, propargyl, etc. The halogenated derivatives, in which the halogen atoms can be fluorine, bromine, chlorine and iodine, may have as many as six halogen atoms per group. Typical derivative groups are chloromethyl, trichloromethyl, dichloromethyl, chloroethyl, trichlorohexyl, bromomethyl, trifluoromethyl, iodobutyl, chlorophenyl, pentachlorophenyl, dichlorocyclohexyl, bromophenyl, iodophenyl, fluorophenyl, trifluoromethylphenyl, chlorovinyl, chloroethynyl, etc.

Typical anhydrides, $CH_2=C(R)COOOCR'$, which can be used for reaction with polymers containing the repeating unit of the structure

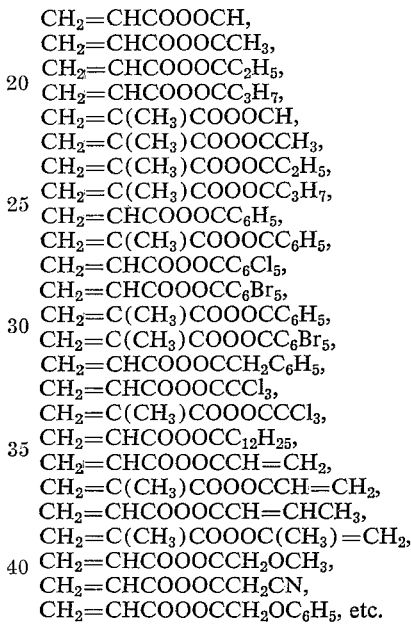

to prepare the crosslinkable polymers of this invention include $CH_2=CHCOOOCH$,
$CH_2=CHCOOOCCH_3$,
$CH_2=CHCOOOCC_2H_5$,
$CH_2=CHCOOOCC_3H_7$,
$CH_2=C(CH_3)COOOCH$,
$CH_2=C(CH_3)COOOCCH_3$,
$CH_2=C(CH_3)COOOCC_2H_5$,
$CH_2=C(CH_3)COOOCC_3H_7$,
$CH_2=CHCOOOCC_6H_5$,
$CH_2=C(CH_3)COOOCC_6H_5$,
$CH_2=CHCOOOCC_6Cl_5$,
$CH_2=CHCOOOCC_6Br_5$,
$CH_2=C(CH_3)COOOCC_6H_5$,
$CH_2=C(CH_3)COOOCC_6Br_5$,
$CH_2=CHCOOOCCH_2C_6H_5$,
$CH_2=CHCOOOCCCl_3$,
$CH_2=C(CH_3)COOOCCCl_3$,
$CH_2=CHCOOOCC_{12}H_{25}$,
$CH_2=CHCOOOCCH=CH_2$,
$CH_2=C(CH_3)COOOCCH=CH_2$,
$CH_2=CHCOOOCCH=CHCH_3$,
$CH_2=C(CH_3)COOOC(CH_3)=CH_2$,
$CH_2=CHCOOOCCH_2OCH_3$,
$CH_2=CHCOOOCCH_2CN$,
$CH_2=CHCOOOCCH_2OC_6H_5$, etc.

Typical R'COOH acids from which the OOCR' portion of the anhydride can be derived include $CH_2=CHCOOH$,
$CH_2=C(CH_3)COOH$,
$HCOOH$,
$CH_3COOH$,
$C_2H_5—COOH$,
$C_3H_7COOH$,
$C_{10}H_{21}COOH$,
$C_{17}H_{35}COOH$,
$C_{17}H_{33}COOH$,
$C_{17}H_{31}COOH$,
$C_{20}H_{41}COOH$,
$Cl_3CCOOH$,
$Br_3CCOOH$,
$Cl_2CHCOOH$,
$ClCH_2COOH$,
$CH_3CH=CHCOOH$,
$HC{\equiv}CCOOH$,
$ClC{\equiv}CCOOH$,
$BrC{\equiv}CCOOH$,
$Br_2C=CBrCOOH$,
$ClCH=CClCOOH$,
$CH_3OCH_2COOH$,
$CH_3COOCH_2COOH$,
$C_6H_5OCH_2COOH$,
$C_6H_5COOCH_2COOH$,
$Cl_6CCOOH$,
$Br_5CCOOH$,
$C_6H_5CH=CHCOOH$,
$H_3COC_6H_4OCH_2COOH$,
$H_3COC_6H_4COOH$,
$C_3H_7C_6H_4COOH$, C₁₀H₇COOH,
Cl₂C₆H₃OCH₂COOH,
Cl₃C₆H₂OCH₂COOH,
HOC₆H₄COOH,
HOOCCH₂CH₂COOC₂H₅,
HOOCCH₂CH₂COOCH₂CH=CH₂,
HOOCCH=CHCOOCH₃,
HOOCCH=CHCOOCH₂CH=CH₂,
HOOCCH₂CH₂COOCH₂CH₂OOCCH=CH₂,
HOOCCH=CHCOOCH₂CH₂OOC(CH₃)=CH₂,

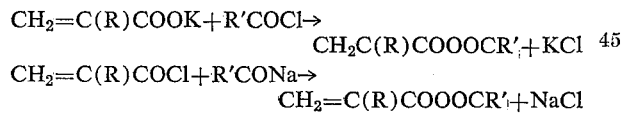

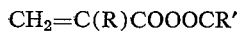

HOOCC₆(Br₄)₄COOCH₃,
HOOCC₆(Cl₄)₄COOCH₂CH=CH₂,
HOOC₆(Cl)₄COOCH₂CH₂OOCCH=CH₂,
HOOCCH₂P(O)(OCH₃)₂,
HOOCCH₂P(O)(OCH₂CH=CH₂)₂,
HOOCCH₂CH₂CON(CH₃)₂, etc.

where the R' group in these acids is not completely hydrocarbon by virtue of the presence of a methoxy, hydroxy or other group as shown, these are considered as equivalent to hydrocarbon for the purpose of this invention.

Many advantages accrue to the use of these anhydrides in this invention beyond the economics of a one-step process. By the use of these anhydrides in the reaction with the epoxy groups of the polymers, derivatives which are difficult to prepare, or cannot be prepared by previously known processes, are readily and easily synthesized, as, for example, the derivatives containing the formyl, trichloroacetyl, etc. groups.

The reaction with the anhydrides can be performed in the range of 0° C. to 125° C. The anhydrides, $$CH_2=C(R)COOOCR'$$

are readily prepared by the metathesis of an acid chloride and an alkali metal carboxylate by the procedure given in the Journal of Organic Chemistry, 26, 1283 (1961), according to the equations:

$$CH_2=C(R)COOK+R'COCl \rightarrow CH_2C(R)COOOCR'+KCl$$
$$CH_2=C(R)COCl+R'CONa \rightarrow CH_2=C(R)COOOCR'+NaCl$$

Various methods of practicing the invention are illustrated by the following examples. These examples are intended merely to illustrates the invention and not in any sense to limit the scope or the manner in which the invention can be practiced. The parts and percentages recited therein and all through this specification, unless specifically provided otherwise, refer to parts and percentages by weight.

EXAMPLE I (a) In suitable apparatus equipped with a stirrer, reflux condenser, an inert gas inlet, heating mantle and thermostatic control, are placed 116 parts of glycidyl acrylate and 140 parts of methyl ethyl ketone. The apparatus is first swept with nitrogen and a nitrogen atmosphere is maintained above the reaction mass. To the above solution is added 0.5 part of azoisobutyronitrile, and the temperature raised to and maintained at 75–80° C. for a period of two hours, and a clear, viscous solution of homopolymer in quantitative yield is obtained which has the structure

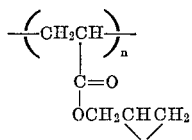

(Ia)

(b) To the above solution is added 114 parts of acetylacrylyl anhydride, $CH_2=CHCOOOCCH_3$, 1 part of triethylamine and 0.5 part of tertiary butyl catechol and after reaction at about 75° C. for about one hour there is obtained a solution of the crosslinkable polymer having the structure.

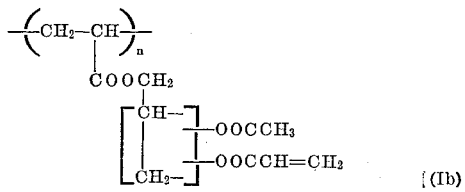

(Ib)

EXAMPLE II

Samples of I(a) are reacted with various other anhydrides in molar amounts equivalent to acetylacrylic anhydride. When the anhydride is (a) $CH_2=C(CH_3)COOOCCH_3$, the resulting structure is

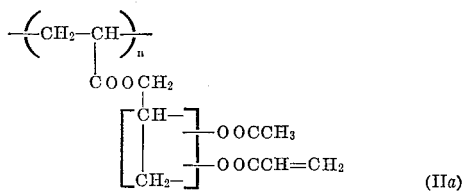

(IIa)

(b) $CH_2=CHCOOOCCHC=CH_2$, the resulting structure is

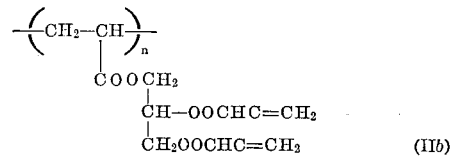

(IIb)

(c) $CH_2=CHCOOOC(CH_3)=CH_2$, the resulting structure is

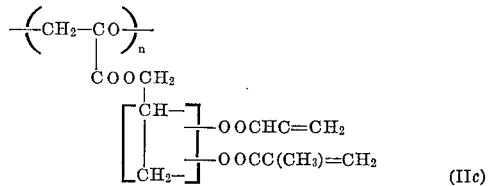

(IIc)

(d) $CH_2=C(CH_3)COOOCC(CH_3)=CH_2$, the resulting structure is

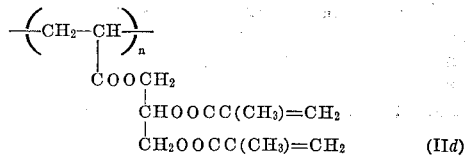

(IId)

(e) $CH_2=CHCOOOCH$, the resulting structure is

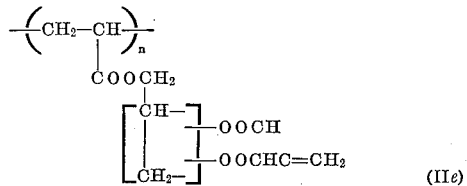

(IIe)

(f) $CH_2=C(CH_3)COOOCH$, the resulting structure is

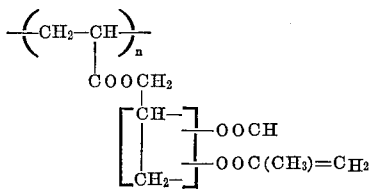

(g) $CH_2=CHCOOOCCHBr=CHBr$, the resulting structure is

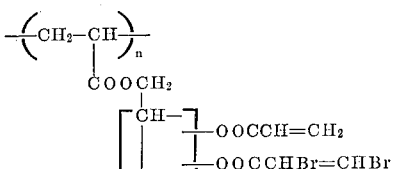

EXAMPLE III

The procedure of Example I is repeated using instead of glycidyl acrylate, 128 parts of glycidyl methacrylate and the resulting homopolymer has the repeating structure

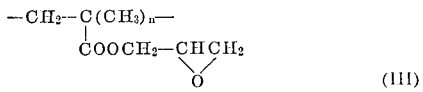
(III)

When subsequent reactions are performed as in I(b) and II(a) through II(g), the corresponding derivatives are obtained as in Examples I and II except that the repeating unit in each case has the $CH_3$ constituent in the repeating unit as shown in Formula III.

Solutions of these polymers, I(b) and II(a) through II(g) and the related esterified polymers of III, containing 0.1 to 10% benzoyl peroxide, tertiary butyl perbenzoate or cumene hydroperoxide, yield, after casting, insoluble, infusible films upon heating at 130° C. for fifteen to thirty minutes.

EXAMPLE IV

The procedure of Example I is repeated a number of times using various proportions of glycidyl acrylate and methyl methacrylate as indicated in the table below using in each case 127 parts of methyl ethyl ketone as solvent.

|  | Parts of methyl methacrylate | Parts of glycidyl acrylate | Molar percent of glycidyl acrylate on monomer portion |
| --- | --- | --- | --- |
| Polymer: |  |  |  |
| IVa | 95 | 6.4 | 5 |
| IVb | 75 | 32.0 | 25 |
| IVc | 50 | 64.0 | 50 |
| IVd | 25 | 96.0 | 75 |
| IVe | 5 | 121.6 | 95 |

In the various solutions the weight percent of monomer mixture in the solution is in the range of approximately 44–50%. The resultant copolymers are represented by the following formula in which the value of n and the value of m for the respective repeating units will vary according to the molar percent of the corresponding monomers used in the reaction mixture. Moreover, while the repeating units are shown grouped in the respective brackets of the formula, these repeating units can be intermingled at random throughout the linear copolymer.

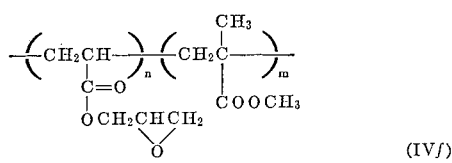
(IVf)

When these products are treated with acetyl-acryloyl anhydride as in Example I(b), they are converted to polymers having the following structure

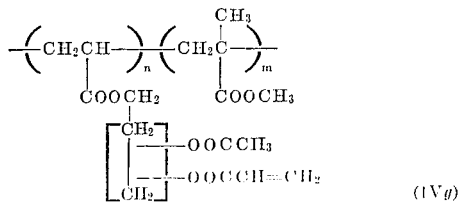
(IVg)

In a similar manner, when polymers of structure IV(f) are reacted with the anhydrides of Example II, polymers similar to structure IV(g) are obtained except, of course, the derivates are those that correspond to the anhydrides used.

EXAMPLE V

The procedure of Example I is repeated using the monomeric mixture of 30 mole percent glycidyl acrylate, 35 mole percent styrene and 35 mole percent methyl methacrylate. The resultant tripolymer has the structure:

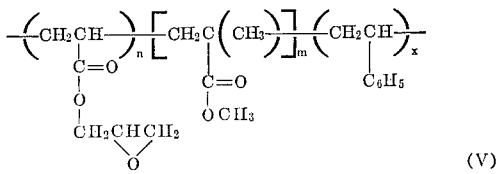
(V)

Again, as indicated above, the number of repeating units indicated by n, m and x corresponds to the mole percent of the corresponding monomer used. Likewise the various repeating units indicated within the brackets are distributed at random throughout the polymer length and they are not in the form of block copolymers.

When this tripolymer is treated with the various anhydrides of Examples I and II, the corresponding acylated derivatives are obtained having the linear chain corresponding to (V) with the pendant ester groups corresponding to the anhydrides used.

EXAMPLE VI

The procedure of Example IV is repeated using in place of the methyl methacrylate, equivalent amounts of methyl acrylate and ethyl acrylate respectively. In each case similar results are obtained except that the repeating units derived from the acrylate varies according to the differences in structure from the starting monomer as compared to the original methyl methacrylate.

EXAMPLE VII

The procedure of Example IV is repeated five times using in each case 30 mole percent of glycidyl acrylate and 70 mole percent of vinyl acetate, acrylonitrile, vinyl chloride, dimethylacrylamide and styrene respectively as comonomers. Similar results are obtained as in Example IV, except that the structure of the repeating unit derived from the comonomer varies according to the structure of the respective comonomers.

EXAMPLE VIII

The procedures of Examples I–VII respectively are repeated. In each case the resultant methyl ethyl ketone solution of each polymer product is poured into twice the volume of methanol to precipitate the dissolved polymer as a powder. Six samples of these precipitated polymers are dissolved in various monomers to give 20 percent solutions in methyl methacrylate, styrene, acrylic acid, diethylaminoacrylate, vinyl acetate and ethyl acrylate. The respective solutions are polymerized using 1 percent cumene hydroperoxide at a temperature of 60–90° C., depending upon the specific monomer. The respective copolymers are found to have excellent adherence to metals, glass, stone, marble, concrete, wood, etc.

When these solutions are exposed to the beam of a 1 mev. van der Graaff accelerator crosslinked polymers are obtained at dosages of less than 8 megarads.

EXAMPLE IX

Films are prepared from the various methyl ethyl ketone solutions derived in Examples I–VII by applying the respective solutions to a surface and allowing the methyl ethyl ketone to evaporate. The desired thickness of film is obtained by repeated applications of solutions on the same surface. These films are exposed to the beam of a 1 mev. van der Graaff accelerator. In each case, except with the samples containing styrene from Examples IV and VII, the sample becomes completely crosslinked and insoluble and infusible at radiation dosages of less than 4 megarads. Apparently because of the aromatic nuclei in the styrene-containing samples, these samples require 8–10 megarads for effecting sufficient crosslinking to produce insolubility and infusibility.

EXAMPLE X

The procedure of Example IX is repeated a number of times, except that prior to laying of the respective films, a solid polymer is added to the solution in such an amount as to give a ratio of one part crosslinkable polymer to three parts of added polymer, with additional methyl ethyl ketone being added where necessary. The respective polymers added are: polymethylmethacrylate, polyvinyl acetate, polyvinyl chloride, polyacrylamide, polyvinyl acetamide, polyhexamethylene, adapamide and cellulose acetate. In each case, the film is converted to an insoluble, infusible film on treatment with no more than four megarads of radiation.

EXAMPLE XI

The procedure of Example X is repeated a number of times, except that the respective solutions are modified by the addition of one percent, based on the polymer content, of cumene hydroperoxide, and instead of the radiation treatment, the solution is cast into films and heat-cured at 130° C. for thirty minutes, yielding solvent-resistant films. Similar results are obtained when other solvents are substituted for the methyl ethyl ketone, and other peroxy catalysts are substituted for the benzoyl peroxide, or azo catalysts such as azoisobutyronitrile are substituted for the peroxy catalysts.

EXAMPLE XII

Twenty parts of the crosslinkable polymer of Example IV(c) is thoroughly and uniformly mixed as a melt with 80 parts of Alkyd Resin A. This is subjected to a radiation dose of 4.5 megarads and produces an insoluble, infusible hard product. Upon repetition, the heat resistance is improved still further with larger amounts of the crosslinkable polymer, and various fillers such as wood flour, alpha cellulose, asbestos, paper, cloth, etc., can be coated or impregnated with the mixture and hardened by radiation to give formed articles of good appearance and excellent properties.

EXAMPLE XIII

The procedure of Example I is repeated a number of times using individually instead of the acetylacrylyl anhydride, an equivalent weight of the following anhydrides respectively to give the corresponding repeating units as indicated:

(a) $CH_2=CHCOOOCCCl_3$

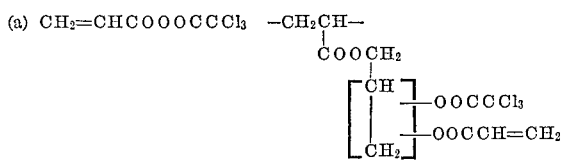

(b) $CH_2=CHCOOOCCBr_3$

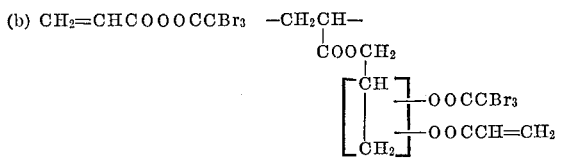

(c) $CH_2=CHCOOOCC_6H_3Cl_3$

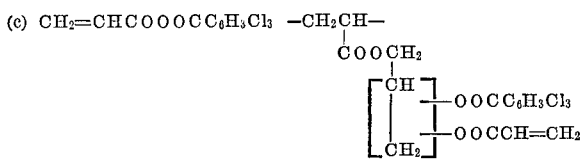

Similar results are obtained with corresponding changes in the repeating unit structure when the following halogenated anhydrides are used:

$CH_2=CHCOOOCCF_3$
$CH_2=CHCOOOCC_6H_2F_4$
$CH_2=CHCOOOCC_6H_3Cl_2$
$CH_2=CHCOOOCC_8H_7I_2$

Similar results are obtained when the other crosslinkable polymers of Example IV are used respectively with Alkyd Resin B–I. When Alkyd Resin J which contains aromatic nuclei is used, a radiation dose of 8 megarads is required to effect a corresponding degree of crosslinking.

Where reference is made herein to molar percent of repeating units in the polymer structure, this is intended to mean solar percent based on the proportion of the specific monomer from which the particular repeating unit is derived as compared to the total monomer composition used to form the polymer. Another way of phrasing this is to state that there are a particular number of the particular repeating units per 100 repeating units of the polymer structure. For example, reference to 5 molar percent of a repeating unit can also be indicated by stating that in the polymer structure there are 5 of said repeating units per each 100 repeating units in the polymer.

Various peroxy type of catalysts and also various azo type catalysts can be used for effecting polymerization and copolymerization of the crosslinkable polymers of this invention. The temperatures suitable for such polymerization are those generally used for the particular catalysts being used, e.g. generally in the range of about 50° C., preferably about 80° C. to 140° C., depending upon the particular catalyst. Also the appropriate temperature will depend on the presence of any solvent whose boiling point might offer a limitation if the polymerization is conducted in an open system. Generally a blanket of an inert gas is maintained over the polymerization mass to prevent discoloration.

Typical azo catalysts that can be used in preparing the starting polymers of this invention include and are not limited to the following: azo-bis-isobutyronitrile; 2,2'-azo-bis-2-ethyl-butyronitrile; alpha, alpha'-azodiisobutyramide, and various other well-known azo catalysts such as disclosed in U.S. Pats. 2,471,959 and 2,492,763.

Free radical generating catalysts of the peroxy type that can be used in polymerizing or copolymerizing the crosslinkable polymers of this invention include but are not restricted to the following: benzoyl peroxide, napthyl peroxide, phthallyl peroxide, tertiary-butyl-hydroperoxide, hydrogen peroxide, cyclohexyl hydroperoxide, tertiary-butyl-perbenzoate, cumene hydroperoxide, etc., persulfates, such as ammonium persulfate, potassium persulfate, persulfuric acid, etc., potassium perphosphate, etc.

While certain features of this invention have been described in detail with respect to various embodiments thereof, it will, of course, be apparent that other modifications may be made within the spirit and scope of this invention and it is not intended to limit the invention to the exact details shown above except insofar as they are defined in the following claims.

The invention claimed is:

1. The process of preparing a crosslinking polymer which comprises reacting a polymer having a plurality of repeating units therein having the formula

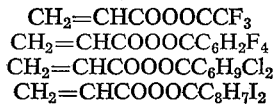

with an anhydride of the formula

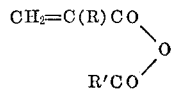

wherein R is a member selected from the class of H and $CH_3$ and R' is a member selected from the class of H, a hydrocarbon group containing one to twelve carbon atoms and a halogenated derivative of the hydrocarbon group.

2. The process of claim 1 in which a tertiaryamine is present in the reaction mixture.

3. The process of claim 1 in which the polymer used in the reaction has a plurality of repeating units of the formula

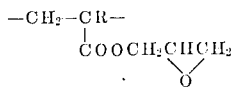

wherein $n$ is at least 2.

4. The process of claim 3 in which the polymer used in the reaction contains 5 to 100 molar percent of the repeating unit

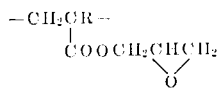

5. The process of claim 4 in which R is H.
6. The process of claim 4 in which R is $CH_3$.
7. The process of claim 4 in which the anhydride is $CH_2=CHCOOOCR'$.
8. The process of claim 4 in which the anhydride is $CH_2=C(CH_3)COOOCR'$.
9. The process of claim 4 in which the anhydride is $CH_2=C(R)COOCC(R)=CH_2$.
10. The process of claim 9 in which the anhydride is $CH_2=CHCOOOCCH=CH_2$.
11. The process of claim 9 in which the anhydride is $CH_2=C(CH_3)COOOC(CH_3)=CH_2$.
12. The process of claim 10 in which the anhydride is $CH_2=CHCOOOCC(CH_3)_2=CH_2$.
13. The process of claim 4 in which the anhydride is $CH_2=CHCOOOCCH_3$.
14. The process of claim 4 in which the anhydride is $CH_2=CHCOOOCH$.
15. The process of claim 4 in which the anhydride is $CH_2=CHCOOOC_6X_5$ in which X represents Cl and Br.

16. A crosslinkable polymer having a plurality of repeating units of the structure

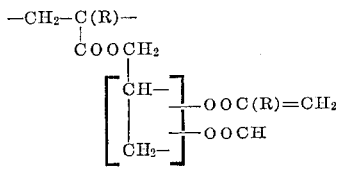

wherein R represents H and $CH_3$.

17. A crosslinkable polymer having a plurality of repeating units of the structure

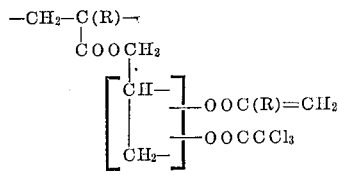

wherein R represents H and $CH_3$.

18. A crosslinkable polymer having a plurality of repeating units of the formula

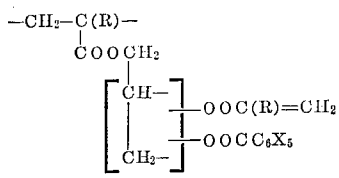

wherein R represents H and $CH_3$, X represents Cl and Br.

References Cited
UNITED STATES PATENTS

| | | | |
|---|---|---|---|
| 3,312,676 | 4/1967 | Rees | 260—80.8 |
| 3,418,295 | 12/1968 | Schoenthaler | 260—80.72 |
| 3,448,089 | 6/1969 | Celeste | 260—78.5 |

JOSEPH L. SCHOFER, Primary Examiner

J. KIGHT III, Assistant Examiner

U.S. Cl. X.R.

106—14; 117—122, 128.4, 145, 155, 161; 161—233, 247, 249, 250; 260—32.8, 41, 47, 78.5, 80.73, 80.75, 80.76, 80.8, 80.81, 83.5, 85.5, 85.7, 86.1, 86.7, 830, 835, 858, 875, 881, 901